(12) United States Patent (10) Patent No.: US 12,568,279 B2
Wang et al. (45) Date of Patent: Mar. 3, 2026

(54) CONTENT RECOMMENDATION METHOD AND APPARATUS

(71) Applicant: BEIJING BYTEDANCE NETWORK TECHNOLOGY CO., LTD., Beijing (CN)

(72) Inventors: Shuai Wang, Beijing (CN); Yaodong Huang, Beijing (CN); Xiang Shen, Singapore (SG)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 6 days.

(21) Appl. No.: 18/843,233

(22) PCT Filed: Feb. 23, 2023

(86) PCT No.: PCT/CN2023/077945
§ 371 (c)(1),
(2) Date: Aug. 30, 2024

(87) PCT Pub. No.: WO2023/165410
PCT Pub. Date: Sep. 7, 2023

(65) Prior Publication Data
US 2025/0193492 A1 Jun. 12, 2025

(30) Foreign Application Priority Data
Mar. 2, 2022 (CN) .......................... 202210197812.4

(51) Int. Cl.
*H04N 21/466* (2011.01)
*H04N 21/231* (2011.01)
*H04N 21/24* (2011.01)
(52) U.S. Cl.
CPC ... *H04N 21/4668* (2013.01); *H04N 21/23106* (2013.01); *H04N 21/2404* (2013.01)

(58) Field of Classification Search
CPC ........... H04N 21/2404; H04N 21/4668; H04N 21/23106
See application file for complete search history.

(56) References Cited

U.S. PATENT DOCUMENTS 6,904,609 B1 * 6/2005 Pietraszak .............. H04N 21/47
725/39
7,076,202 B1 * 7/2006 Billmaier ........... H04N 21/4334
455/66.1

(Continued)

FOREIGN PATENT DOCUMENTS

CN 104135672 A 11/2014
CN 106161569 A 11/2016

(Continued)

OTHER PUBLICATIONS

International Patent Application No. PCT/CN2023/077945; Int'l Written Opinion and Search Report; dated Apr. 24, 2023; 7 pages.

(Continued)

*Primary Examiner* — Michael B. Pierorazio
(74) *Attorney, Agent, or Firm* — BakerHostetler

(57) ABSTRACT

This disclosure discloses a content recommendation method and apparatus. The content recommendation method includes: receiving, from a terminal device, content request information for requesting to acquire a recommendation content item corresponding to a target user; determining whether a recommendation server is faulty; acquiring a first recommendation content item according to a recommendation cache corresponding to the target user in response to the recommendation server being faulty, wherein a plurality of recommendation content items are stored in the recommendation cache corresponding to the target user, and the plurality of recommendation content items are written when (Continued)

the recommendation server is not faulty; and sending the first recommendation content item to the terminal device.

20 Claims, 3 Drawing Sheets

(56)                References Cited

U.S. PATENT DOCUMENTS

| 7,370,342 | B2 * | 5/2008 | Ismail | H04N 21/252 |
| | | | | 348/E5.002 |
| 7,433,873 | B2 * | 10/2008 | Kang | H04N 21/8543 |
| 7,484,233 | B2 * | 1/2009 | Pietraszak | H04N 21/84 |
| | | | | 725/39 |
| 7,603,687 | B2 * | 10/2009 | Pietraszak | H04N 21/4782 |
| | | | | 725/50 |
| 8,051,454 | B2 * | 11/2011 | Krikorian | H04L 65/613 |
| | | | | 725/95 |
| 8,255,531 | B2 * | 8/2012 | Bose | G06F 3/1462 |
| | | | | 709/227 |
| 8,280,949 | B2 * | 10/2012 | Bergquist | H04N 21/47202 |
| | | | | 709/248 |
| 8,302,127 | B2 * | 10/2012 | Klarfeld | H04N 21/4751 |
| | | | | 705/14.66 |
| 8,458,613 | B2 * | 6/2013 | Oshiro | G06F 3/04842 |
| | | | | 715/810 |
| 8,495,679 | B2 * | 7/2013 | Labeeb | H04N 21/26283 |
| | | | | 725/40 |
| 8,612,598 | B1 * | 12/2013 | Chaudhry | H04N 21/2665 |
| | | | | 709/212 |
| 9,838,728 | B2 * | 12/2017 | Kannan | H04N 21/4532 |
| 10,154,298 | B2 * | 12/2018 | Kannan | H04N 21/25891 |
| 2003/0046689 | A1 * | 3/2003 | Gaos | H04N 21/42203 |
| | | | | 715/745 |
| 2003/0067554 | A1 * | 4/2003 | Klarfeld | G11B 27/322 |
| | | | | 725/135 |
| 2003/0093792 | A1 * | 5/2003 | Labeeb | H04N 21/26283 |
| | | | | 725/38 |
| 2004/0123319 | A1 * | 6/2004 | Kim | H04N 7/165 |
| | | | | 348/E7.063 |
| 2004/0139480 | A1 * | 7/2004 | Delpuch | H04N 7/17318 |
| | | | | 348/E7.071 |
| 2005/0097605 | A1 * | 5/2005 | Itou | H04N 7/17336 |
| | | | | 725/39 |
| 2005/0177849 | A1 * | 8/2005 | Pietraszak | H04N 21/4622 |
| | | | | 725/39 |
| 2005/0183116 | A1 * | 8/2005 | Pietraszak | H04N 21/47 |
| | | | | 725/39 |
| 2006/0047668 | A1 * | 3/2006 | Kang | H04N 21/8543 |
| 2006/0206912 | A1 * | 9/2006 | Klarfeld | H04N 21/4823 |
| | | | | 725/39 |
| 2006/0212900 | A1 * | 9/2006 | Ismail | H04N 21/44224 |
| | | | | 725/35 |
| 2006/0212904 | A1 * | 9/2006 | Klarfeld | H04N 21/6587 |
| | | | | 725/45 |
| 2007/0112826 | A1 * | 5/2007 | Laksono | G11B 20/00007 |
| | | | | 707/999.102 |

| 2008/0114880 | A1 * | 5/2008 | Jogand-Coulomb | H04L 63/10 |
| | | | | 709/227 |
| 2009/0030792 | A1 * | 1/2009 | Khivesara | H04L 67/303 |
| | | | | 705/14.51 |
| 2009/0106391 | A1 * | 4/2009 | Wang | H04L 12/1895 |
| | | | | 709/217 |
| 2009/0133074 | A1 * | 5/2009 | White | H04N 7/165 |
| | | | | 725/50 |
| 2009/0248700 | A1 * | 10/2009 | Amano | G06F 16/313 |
| 2009/0260038 | A1 * | 10/2009 | Acton | H04N 21/482 |
| | | | | 725/49 |
| 2010/0162305 | A1 * | 6/2010 | Downey | H04N 21/47 |
| | | | | 725/39 |
| 2010/0191860 | A1 * | 7/2010 | Krikorian | H04N 21/47202 |
| | | | | 709/231 |
| 2010/0205636 | A1 * | 8/2010 | Coburn | H04N 21/44224 |
| | | | | 725/46 |
| 2010/0223407 | A1 * | 9/2010 | Dong | H04N 21/2402 |
| | | | | 710/70 |
| 2010/0287588 | A1 * | 11/2010 | Cox | H04N 21/4668 |
| | | | | 725/40 |
| 2010/0299264 | A1 * | 11/2010 | Berger | G06Q 30/0601 |
| | | | | 705/59 |
| 2011/0116540 | A1 * | 5/2011 | O'Connor | H04N 21/47 |
| | | | | 725/54 |
| 2011/0126232 | A1 * | 5/2011 | Lee | H04N 21/6405 |
| | | | | 707/E17.049 |
| 2011/0161622 | A1 * | 6/2011 | Maeda | G06F 12/1027 |
| | | | | 711/207 |
| 2011/0185387 | A1 * | 7/2011 | Schein | H04N 7/165 |
| | | | | 725/46 |
| 2012/0023529 | A1 * | 1/2012 | Azam | H04N 21/2221 |
| | | | | 725/93 |
| 2015/0189353 | A1 * | 7/2015 | Kannan | H04N 21/482 |
| | | | | 725/54 |
| 2018/0077441 | A1 * | 3/2018 | Kannan | H04N 21/84 |
| 2020/0242179 | A1 * | 7/2020 | Mukai | G06F 16/9538 |
| 2020/0412786 | A1 * | 12/2020 | Loheide | H04L 65/611 |
| 2021/0058675 | A1 | 2/2021 | Qin | |
| 2021/0326674 | A1 * | 10/2021 | Liu | G06N 3/09 |

FOREIGN PATENT DOCUMENTS

| CN | 109150983 | A | 1/2019 |
| CN | 109729432 | A | 5/2019 |
| CN | 111680254 | A | 9/2020 |
| CN | 113268666 | A | 8/2021 |
| JP | 2014-149645 | A | 8/2014 |
| WO | WO 2021/249249 | A1 | 12/2021 |

OTHER PUBLICATIONS

European Patent Application No. 23762810.2; Extended Search Report; dated Feb. 19, 2025; 11 pages.
Japan Patent Application No. 2024-552074; Notice of Refusal; dated Feb. 18, 2025; 6 pages.

* cited by examiner

CONTENT RECOMMENDATION METHOD AND APPARATUS

CROSS-REFERENCE TO RELATED APPLICATIONS

The present disclosure is a U.S. National Stage Application under 35 U.S.C. § 371 of International Patent Application No. PCT/CN2023/077945, filed on Feb. 23, 2023, which is based on and claims priority of Chinese application for invention No. 202210197812.4, filed on Mar. 2, 2022, the disclosure of which is hereby incorporated into this disclosure by reference in its entirety.

TECHNICAL FIELD

The present invention relates to the technical field of content recommendation, in particular to a content recommendation method and apparatus.

BACKGROUND

At present, many applications provide content to users through personalized recommendation methods. Such applications that provide content to users through recommendation are called recommendation information flow applications, for example, short video applications that provide video content items to users through personalized recommendation.

SUMMARY

In a first aspect, an embodiment of the present invention provides a content recommendation method applied to an information flow server, and the method comprises:

receiving, from a terminal device, content request information for requesting to acquire a recommendation content item corresponding to a target user;

determining whether a recommendation server is faulty;

acquiring a first recommendation content item according to a recommendation cache corresponding to the target user in response to the recommendation server being faulty, wherein a plurality of recommendation content items are stored in the recommendation cache corresponding to the target user, and the plurality of recommendation content items are written when the recommendation server is not faulty; and sending the first recommendation content item to the terminal device.

As an optional implementation of the embodiment of the present invention, the method further comprises:

sending recommendation request information to the recommendation server in response to the recommendation server being normal, wherein the recommendation request information is configured for requesting to acquire the recommendation content item corresponding to the target user;

receiving a second recommendation content item sent from the recommendation server; and sending the second recommendation content item to the terminal device.

As an optional implementation of the embodiment of the present invention, the determining whether a recommendation server is faulty comprises:

acquiring status indication information of the recommendation server; and determining whether the recommendation server is faulty according to the status indication information.

As an optional implementation of the embodiment of the present invention, the determining whether a recommendation server is faulty comprises:

determining that the recommendation server is faulty in response to receiving no response information returned from the recommendation server within a preset response time.

As an optional implementation of the embodiment of the present invention, the recommendation content items in the recommendation cache are ranked in a descending order according to relevance to the target user, and the acquiring the first recommendation content item according to the recommendation cache corresponding to the target user comprises:

determining a first number of recommendation content item(s) ranked top in the recommendation cache; and generating the first recommendation content item according to the first number of recommendation content item(s) ranked top in the recommendation cache.

In a second aspect, an embodiment of the present invention provides a content recommendation method applied to a recommendation server, and the method comprises:

receiving recommendation request information sent from an information flow server, wherein the recommendation request information is configured for requesting to acquire a recommendation content item corresponding to a target user;

acquiring a recommendation content sequence corresponding to the target user according to a preset recommendation algorithm, wherein the recommendation content sequence comprise a plurality of recommendation content items, and the plurality of recommendation content items are ranked in a descending order according to relevance to the target user; and sending a second number of recommendation content item(s) ranked top in the recommendation content sequence to the information flow server, and writing the recommendation content sequence into a recommendation cache corresponding to the target user.

As an optional implementation of the embodiment of the present invention, the method further comprises:

sending status indication information to the information flow server, wherein the status indication information is configured for indicating whether the recommendation server is faulty.

As an optional implementation of the embodiment of the present invention, the method further comprises:

before writing the recommendation content sequence into the recommendation cache corresponding to the target user, performing deduplication processing on the recommendation content items in the recommendation content sequence according to recommendation content item(s) stored in the recommendation cache corresponding to target user and recommendation content item(s) sent to the information flow server.

As an optional implementation of the embodiment of the present invention, the method further comprises:

clearing the recommendation content item(s) in the recommendation cache corresponding to the target user in response to a length of time exceeds a first time, wherein the recommendation content item(s) corresponding to the target user are not sent from the information flow server to a terminal device corresponding to the target user in the length of time.

As an optional implementation of the embodiment of the present invention, the method further comprises:

determining a capacity of a cache space for storing a recommendation cache corresponding to each user according to at least one of an average number of active users of the recommendation server within the first time, an average fault repair time of the recommendation server, an average time of consuming a single recommendation content item, an average data volume of a single recommendation content item or a fault tolerance factor.

As an optional implementation of the embodiment of the present invention, the capacity of the cache space of the recommendation cache corresponding to the each user has a positive correlation with the average number of active users of the recommendation server within the first time, the average fault repair time of the recommendation server, the average data volume of a single recommendation content item or the fault tolerance factor, and has a negative correlation with the average time of consuming a single recommendation content.

As an optional implementation of the embodiment of the present invention, the determining the capacity of the cache space for storing the recommendation cache corresponding to the each user according to at least one of the average number of active users of the recommendation server within the first time, the average fault repair time of the recommendation server, the average time of consuming a single recommendation content item, the average data volume of a single recommendation content item or the fault tolerance factor comprises:

determining the capacity of the cache space for storing the recommendation cache corresponding to the each user according to the average number of active users of the recommendation server within the first time, the average fault repair time of the recommendation server, the average time of consuming a single recommendation content item, the average data volume of a single recommendation content item and the fault tolerance factor and the following formula:

$$CacheSize = \frac{TTR}{T} * S * AU * F;$$

wherein CacheSize is the capacity of the cache space for storing the recommendation cache corresponding to the each user, TTR is the average fault repair time of the recommendation server, T is the average time for consuming a single recommendation content, S is the average data volume of a single recommendation content, AU is the average number of active users of the recommendation server within the first time, and F is the fault tolerance factor.

In a third aspect, an embodiment of the present invention provides an information flow server, comprising:

a receiving unit configured to receive, from a terminal device, content request information for requesting to acquire a recommendation content item corresponding to a target user;

a processing unit configured to determine whether a recommendation server is faulty;

an acquisition unit configured to acquire a first recommendation content item according to a recommendation cache corresponding to the target user in response to the recommendation server being faulty, wherein a plurality of recommendation content items are stored in the recommendation cache corresponding to the target user, and the plurality of recommendation content items are written when the recommendation server is not faulty; and a sending unit configured to send the first recommendation content item to the terminal device.

As an optional implementation of the embodiment of the present invention, the sending unit is further configured to send recommendation request information to the recommendation server in response to the recommendation server being normal, wherein the recommendation request information is configured for requesting to acquire the recommendation content item corresponding to the target user;

the receiving unit is further configured to receive a second recommendation content item sent from the recommendation server;

the sending unit is further configured to send the second recommendation content item to the terminal device.

As an optional implementation of the embodiment of the present invention, the processing unit is specifically configured to acquire status indication information of the recommendation server; and determine whether the recommendation server is faulty according to the status indication information.

As an optional implementation of the embodiment of the present invention, the processing unit is specifically configured to determine that the recommendation server is faulty in response to receiving no response information returned from the recommendation server within a preset response time.

As an optional implementation of the embodiment of the present invention, the recommendation content items in the recommendation cache are ranked in a descending order according to relevance to the target user;

the acquisition unit is specifically configured to determine a first number of recommendation content item(s) ranked top in the recommendation cache; and generate the first recommendation content item according to the first number of recommendation content item(s) ranked top in the recommendation cache.

In a fourth aspect, an embodiment of the present invention provides a recommendation server, comprising:

a receiving unit, configured to receive recommendation request information sent from an information flow server, wherein the recommendation request information is configured for requesting to acquire a recommendation content item corresponding to a target user;

a processing unit, configured to acquire a recommendation content sequence corresponding to the target user according to a preset recommendation algorithm, wherein the recommendation content sequence comprise a plurality of recommendation content items, and the plurality of recommendation content items are ranked in a descending order according to relevance to the target user;

a sending unit, configured to send a second number of recommendation content item(s) ranked top in the recommendation content sequence to the information flow server;

a cache management unit, configured to write the recommendation content sequence into a recommendation cache corresponding to the target user.

As an optional implementation of the embodiment of the present invention, the sending unit is further configured to send status indication information to the information flow server, wherein the status indication information is configured for indicating whether the recommendation server is faulty.

As an optional implementation of the embodiment of the present invention, the cache management unit is further configured to, before writing the recommendation content sequence into the recommendation cache corresponding to the target user, perform deduplication processing on the recommendation content items in the recommendation content sequence according to recommendation content items stored in the recommendation cache corresponding to target user and recommendation content item(s) sent to the information flow server.

As an optional implementation of the embodiment of the present invention, the cache management unit is further configured to clear the recommendation content items in the recommendation cache corresponding to the target user in response to a length of time exceeds a first time, wherein the recommendation content item(s) corresponding to the target user are not sent from the information flow server to a terminal device corresponding to the target user in the length of time.

As an optional implementation of the embodiment of the present invention, the cache management unit is further configured to determine a capacity of a cache space for storing a recommendation cache corresponding to each user according to at least one of an average number of active users of the recommendation server within the first time, an average fault repair time of the recommendation server, an average time of consuming a single recommendation content item, an average data volume of a single recommendation content item or a fault tolerance factor.

As an optional implementation of the embodiment of the present invention, the capacity of the cache space of the recommendation cache corresponding to the each user has a positive correlation with the average number of active users of the recommendation server within the first time, the average fault repair time of the recommendation server, the average data volume of a single recommendation content item or the fault tolerance factor, and has a negative correlation with the average time of consuming a single recommendation content.

As an optional implementation of the embodiment of the present invention, the cache management unit is specifically configured to determine the capacity of the cache space for storing the recommendation cache corresponding to the each user according to the average number of active users of the recommendation server within the first time, the average fault repair time of the recommendation server, the average time of consuming a single recommendation content item, the average data volume of a single recommendation content item and the fault tolerance factor and the following formula:

$$CacheSize = \frac{TTR}{T} * S * AU * F;$$

wherein CacheSize is the capacity of the cache space for storing the recommendation cache corresponding to the each user, TTR is the average fault repair time of the recommendation server, T is the average time for consuming a single recommendation content, S is the average data volume of a single recommendation content, AU is the average number of active users of the recommendation server within the first time, and F is the fault tolerance factor.

In a fifth aspect, an embodiment of the present invention provides an electronic device comprising a memory and a processor, wherein the memory is used for storing a computer program; the processor is used to cause the electronic device to implement the content recommendation method described in any one of the above embodiments when executing the computer program.

In a sixth aspect, an embodiment of the present invention provides a non-transitory computer-readable storage medium that, when the computer program is executed by a computing device, causes the computing device to implement the content recommendation method described in any of the above embodiments.

In a seventh aspect, an embodiment of the present invention provides a non-transitory computer program product which, when run on a computer, causes the computer to implement the content recommendation method described in any of the above embodiments.

In an eighth aspect, an embodiment of the present invention provides a computer program, comprising: instructions which, when executed by a processor, cause the processor to execute the content recommendation method described in any one of the above embodiments.

BRIEF DESCRIPTION OF THE DRAWINGS

The drawings, which are incorporated in and constitute a part of this description, illustrate embodiments consistent with the present invention and, and together with the description, serve to explain the principles of the present invention.

In order to more clearly illustrate the technical solutions in the embodiments of the present invention or the prior art, a brief introduction will be given below for the drawings required to be used in the description of the embodiments or the prior art. It is obvious that, for an ordinary skilled in the art, other drawings may also be acquired according to such drawings without paying inventive efforts.

DETAILED DESCRIPTION

In order that the above objects, features and advantages of the present invention may be more clearly understood, the solutions of the present invention will be further described below. It is to be noted that, without conflictions, the embodiments and the features in the embodiments of the present invention can be combined with each other.

Many details are illustrated hereinbelow to facilitate sufficient understandings on the present invention, but the present invention may also be implemented by manners different than those as mentioned here. Obviously, the embodiments as described are just a part, instead of all, of the embodiments of the present invention.

In the embodiment of the present invention, the words "illustratively" or "for example" are used to express as examples, illustrations or explanations. Any embodiment or design described as "illustratively" or "for example" among the embodiments of the present invention should not be interpreted as being more preferred or advantageous than other embodiments or designs. To be exact, the words "illustratively" or "for example" are called to present related concepts in a concrete way. In addition, in the description of the embodiments of the present invention, unless otherwise specified, the meaning of "a plurality of" refers to two or more.

Because the content items provided by a recommendation information flow application to users are all generated by a recommendation system, the stability of the recommendation information flow application depends heavily on the stability of the recommendation system. In response to the recommendation system being faulty, the recommendation information flow application can only provide content to users randomly, and users will feel uninterested in the pushed content, which will seriously affect the user experience. Therefore, how to improve the stability of the recommendation information flow application is an urgent problem to be solved.

In view of this, the embodiments of the present invention provide a content recommendation method and apparatus, which are used for improving the stability of the recommendation information flow application.

Firstly, a architecture of a scene of the content recommendation method provided by an embodiment of the present invention is described below.

Figure 1:
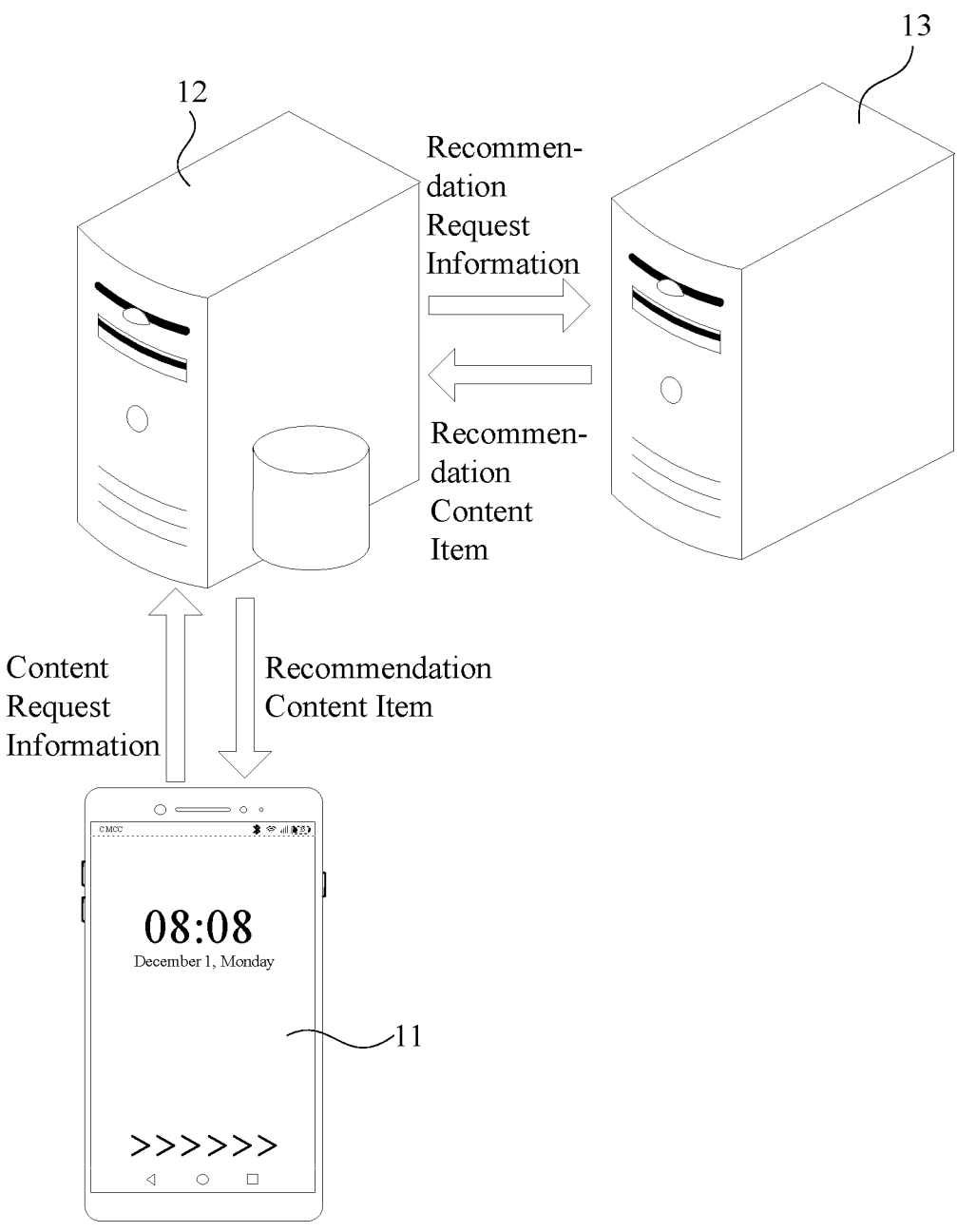
FIG. 1 is a architecture diagram of a scene of a content recommendation method provided by an embodiment of the present invention.

Referring to FIG. 1, in some embodiments, the scene architecture of the content recommendation method provided by the embodiments of the present invention includes a terminal device 11, an information flow server 12 and a recommendation server 13.

The terminal device 11 is installed with a recommendation information flow application, and can send, in response to a user's operation on the recommendation information flow application, content request information for requesting recommendation content corresponding to the login user of the recommendation information flow application to the information flow server 12. When receiving the content request information sent from the terminal device 11, the information flow server 12 first determines whether the recommendation server 13 is faulty. In response to the recommendation server 13 being normal (no fault has occurred), server 12 sends the recommendation request information to the recommendation server 13, receives the recommendation content item(s) sent from the recommendation server 13, and sends the recommendation content item(s) sent from the recommendation server to the terminal device. In response to the recommendation server 13 being faulty, recommendation content item(s) are generated according to the recommendation content item(s) written into the recommendation cache when the recommendation server 13 is not faulty, and are sent to the terminal device. The recommendation server 13 is configured to determine the recommendation content item(s) corresponding to the user based on a recommendation algorithm in response to the recommendation request information, generate recommendation content item(s) to be sent to the information flow server 12 according to a determined recommendation content sequence, and write the determined recommendation content sequence into the recommendation cache.

The terminal device 11 in the embodiment of the present invention may be a mobile terminal device or a non-mobile terminal device. The mobile terminal device can be a mobile phone, a tablet computer, a notebook computer, a PDA, a vehicle terminal, a wearable device, an ultra-mobile personal computer (UMPC), a netbook, a personal digital assistant (PDA), etc. The non-mobile terminal device may be a personal computer (PC), a television (TV), a teller machine or a self-service machine, or the terminal device 11 may be other types of devices, which is not limited by the embodiment of the present invention.

Figure 2:
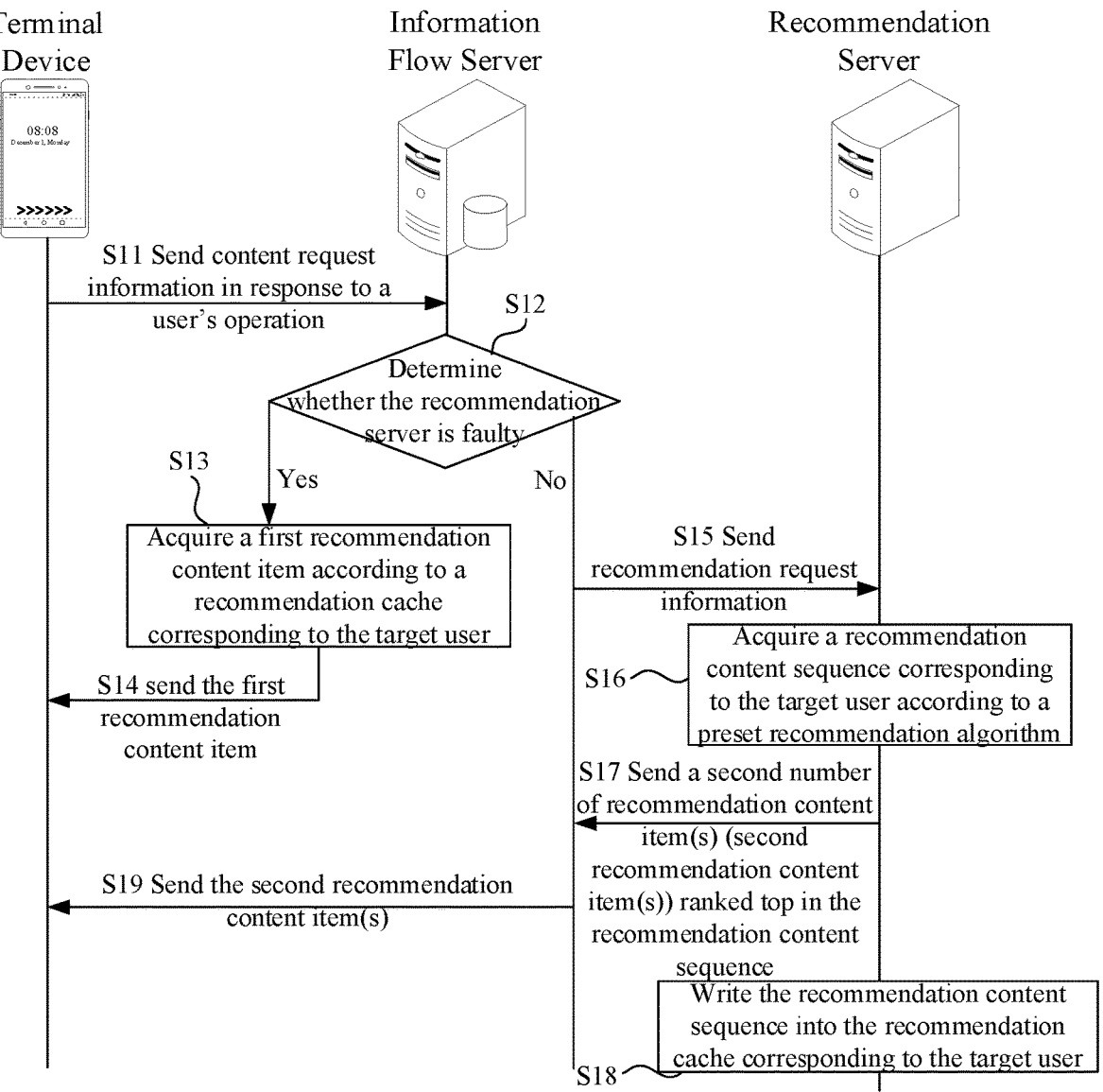
FIG. 2 is an interactive flow diagram of a content recommendation method provided by an embodiment of the present invention.

An embodiment of the present invention provides a content recommendation method. Referring to FIG. 2, the content recommendation method includes the following steps S11 to S19.

In step S11, the terminal device sends content request information to an information flow server in response to a user's operation.

Correspondingly, the information flow server receives the content request information sent from the terminal device.

The content request information is used for requesting to obtain recommendation content corresponding to a target user.

The target user in the embodiment of the present invention can be the login user of the recommendation information flow application installed in the terminal device. The terminal device can carry an identification of the target user in the content request information to request to obtain the recommendation content item corresponding to the target user. The identification of the target user can be specifically an Identity Document (ID) of the target user, a login account of the target user, etc.

In step S12, the information flow server determines whether the recommendation server is faulty.

In some embodiments, the implementation of the information flow server determining whether the recommendation server is faulty includes:

the information flow server sends a request to the recommendation server to obtain the recommendation request information of the recommendation content corresponding to the target user;

in response to the response information returned by the recommendation server being received within a response time, it is determined that the recommendation server is normal (no fault has occurred), and the response time is, for example, a preset value;

in response to the response information returned by the recommendation server being not received within the response time, it is determined that the recommendation server is faulty.

In some embodiments, the response time can be set according to a maximum response time of the recommendation server. For example, if the maximum response time of the recommendation server is 2 seconds, the response time can be set to 2 seconds.

In other embodiments, the implementation of the information flow server determining whether the recommendation server is faulty includes:

the information flow server acquires a status indication information of the recommendation server, and determines whether the recommendation server is faulty according to the status indication information.

In some embodiments, the implementation of the information flow server acquiring the status indication information of the recommendation server includes:

optionally, the implementation of the recommendation server sending the status indication information to the information flow server can be configuring the recommendation server to send the status indication information to the information flow server periodically with a preset time as a period; it can also be configuring the recommendation server to send the status indication information to the information flow server when the status changes (from faulty to normal or from normal to faulty); or it can also be sending a status indication information to the recommendation server and receiving the status indication information sent from the recommendation server.

That is, the content recommendation method provided by the embodiment of the present invention further comprises:

the recommendation server sending status indication information to the information flow server, wherein the status indication information is configured to indicate whether the recommendation server is faulty.

In the above step S12, in response to the information flow server determining that the recommendation server is faulty, the content recommendation method provided by the embodiment of the present invention further performs the following steps S13 and S14.

In step S13, the information flow server acquires a first recommendation content item according to a recommendation cache corresponding to the target user.

The recommendation cache stores a plurality of recommendation content items corresponding to the target user, and the plurality of recommendation content items are written by the recommendation server when there is no fault.

In some embodiments, the implementation of acquiring the first recommendation content item according to the recommendation cache corresponding to the target user includes:

determining a first number of recommendation content item(s) ranked top in the recommendation cache, wherein the first number is, for example, a preset value;

generating the first recommendation content item according to the first number of recommendation content item(s) ranked top in the recommendation cache.

In some embodiments, the recommendation cache corresponding to the target user stores identification information of the recommendation content items corresponding to the target user, and the implementation of the information flow server acquiring the first recommendation content item according to the recommendation cache corresponding to the target user comprises:

acquiring identification information of at least one recommendation content item according to the recommendation cache corresponding to the target user;

acquiring the first recommendation content item according to the identification information of the at least one recommendation content.

In some embodiments, the generating, by the information flow server, the first recommendation content item according to the first number of recommendation content item(s) ranked top in the recommendation cache includes:

the information flow server removes recommendation content item(s) that have been sent to the terminal device from the first number of recommendation content item(s) ranked top in the recommendation cache to generate the first recommendation content.

For example, if the first number is 4, the first four recommendation content items in the recommendation cache include recommendation content item A, recommendation content item B, recommendation content item C and recommendation content item D, and the recommendation content item C has been sent to the terminal device, then the generated first recommendation content items include recommendation content item A, recommendation content item B and recommendation content item D.

In step S14, the information flow server sends the first recommendation content item to the terminal device.

Correspondingly, the terminal device receives the first recommendation content item sent from the information flow server.

At this point, the information flow server can also send the recommendation content item(s) corresponding to the target user to the terminal device when the recommendation server is faulty, which avoids providing content to users randomly when the recommendation server is faulty and improves the stability of the recommendation information flow application.

In the above step S12, in response to the information flow server determining that the recommendation server being normal, the content recommendation method provided by the embodiment of the present invention further performs the following steps S15 to S19.

In step S15, the information flow server sends recommendation request information to the recommendation server.

Correspondingly, the recommendation server receives the recommendation request information sent from the information flow server.

The recommendation request information is configured for requesting to acquire recommendation content item corresponding to the target user.

Similarly, the information flow server can carry the identification information of the target user in the recommendation request information to request to acquire the recommendation content item corresponding to the target user.

In step S16, the recommendation server acquires a recommendation content sequence corresponding to the target user according to a preset recommendation algorithm.

The recommendation content sequence includes a plurality of recommendation content items, and the plurality of recommendation content items are sorted in descending order according to relevance to the target user.

In some embodiments, the implementation of the recommendation server acquiring a recommendation content sequence corresponding to the target user according to a preset recommendation algorithm may include:

acquiring relevance of each of content items to the target user according to a preset recommendation algorithm;

sorting the content items in descending order according to the relevance to acquire the sorting result of the content items;

taking top m content item(s) of the sorting result as the recommendation content sequence corresponding to the target user.

The value of m can be set as a parameter of the recommendation algorithm according to requirements. Illustratively, the value of m may be 1000, 2000, etc.

In step S17, the recommendation server sends a second number of recommendation content item(s) (second recommendation content item(s)) ranked top in the recommendation content sequence to the information flow server, wherein the second number is, for example, a preset value.

Correspondingly, the information flow server receives the second recommendation content item(s) (the second number of recommendation content items ranked top in the recommendation content sequence) sent from the recommendation server.

In the embodiment of the present invention, the second number is not limited, and the second number can be set as any positive integer according to the requirements in actual use. Illustratively, the second number may be 4 or 6.

In step S18, the recommendation server writes the recommendation content sequence into the recommendation cache corresponding to the target user.

In some embodiments, the content recommendation method provided by the embodiment of the present invention further comprises:

before writing the recommendation content sequence into the recommendation cache corresponding to the target user, performing deduplication processing on the recommendation content items in the recommendation content sequence according to recommendation content items stored in the recommendation cache corresponding to target user and recommendation content item(s) sent to the information flow server.

Since the embodiment of the present invention will perform deduplication processing on the recommendation content items in the recommendation content sequence according to the recommendation content items stored in the recommendation cache corresponding to the target user and the recommendation content item(s) sent to the information flow serve before writing the recommendation content sequence into the recommendation cache corresponding to the target user, the embodiment of the present invention can avoid storing duplicate recommendation content items in the recommendation cache, thus avoiding a waste of cache space caused by duplicate recommendation content items.

In step S19, the information flow server sends the second recommendation content item(s) to the terminal device.

Correspondingly, the terminal device receives the second recommendation content item(s) sent from the information flow server.

Upon receiving the content request information sent from the terminal device for requesting to obtain a recommendation content item corresponding to a target user, the content recommendation method provided by the embodiment of the present invention firstly determines whether the recommendation server is faulty, and in response to the recommendation server being faulty, it acquires the first recommendation content item according to a plurality of recommendation content items written into the recommendation cache by the recommendation server when there is no fault, and sends the first recommendation content item to the terminal device. Because the content recommendation method provided by the embodiment of the present invention can write a plurality of recommendation content items corresponding to the target user into the recommendation cache corresponding to the target user when the recommendation server is not faulty, and acquire the recommendation content item sent to the terminal device according to the recommendation cache corresponding to the target user when the recommendation server fails, the content recommendation method provided by the embodiment of the present invention can still send the recommendation content item corresponding to the user to the terminal device during the failure of the recommendation server, so as to avoid affecting the user experience. Thus, the embodiment of the present invention can improve the stability of the recommendation information flow application.

As an optional way of the embodiment of the present invention, the content recommendation method provided by the embodiment of the present invention further comprises:

the recommendation server clears the recommendation content items in the recommendation cache corresponding to the target user in response to a length of time exceeds a first time, wherein the recommendation content item(s) corresponding to the target user are not sent from the information flow server to a terminal device corresponding to the target user in the length of time.

It should be noted that after the terminal device sends the content request information to the information flow server, the information flow server will return the recommendation content item to the terminal device regardless of whether the recommendation server is faulty, so the length of time that the information flow server does not send the recommendation content item(s) corresponding to the target user to the terminal device corresponding to the target user is the length of time that the terminal device does not send the content request information to the information flow server, so whether to clear the recommendation content item(s) in the recommendation cache corresponding to the target user can also be determined by the length of time that the terminal device does not send the content request information to the information flow server.

The above embodiment clears the recommendation content item(s) in the recommendation cache corresponding to the target user when the length of time that the information flow server does not send the recommendation content item(s) corresponding to the target user to the terminal device corresponding to the target user exceeds a first time, so the above embodiment can clear the recommendation cache corresponding to the target user when the target user does not use the recommendation information flow application for a long time, thereby improving the utilization rate of the cache space.

As an optional implementation of the embodiment of the present invention, the content recommendation method provided by the embodiment of the present invention further comprises:

the recommendation server determines a capacity of a cache space for storing a recommendation cache corresponding to each user according to at least one of an average number of active users of the recommendation server within the first time, an average fault repair time of the recommendation server, an average time of consuming a single recommendation content item, an average data volume of a single recommendation content item or a fault tolerance factor.

In some embodiments, the capacity of the cache space of the recommendation cache corresponding to the each user has a positive correlation with the average number of active users of the recommendation server within the first time, the average fault repair time of the recommendation server, the average data volume of a single recommendation content item or the fault tolerance factor, and has a negative correlation with the average time of consuming a single recommendation content.

Illustratively, the first time is 24 hours, and the average number of active users of the recommendation server within the first time is the number of Daily Active User (DUA) of the recommendation server.

Illustratively, the first time is one week, and the average number of active users of the recommendation server within the first time is the number of Week Active User (WUA) of the recommendation server.

In some embodiments, the average failure repair time of the recommendation server can be predicted according to historical data.

Illustratively, the fault tolerance factor may be 1.1 or 1.2.

Further, the determining the capacity of the cache space for storing the recommendation cache corresponding to the each user according to at least one of the average number of active users of the recommendation server within the first time, the average fault repair time of the recommendation server, the average time of consuming a single recommendation content item, the average data volume of a single recommendation content item or the fault tolerance factor comprises:

determining the capacity of the cache space for storing the recommendation cache corresponding to the each user according to the average number of active users of the recommendation server within the first time, the average fault repair time of the recommendation server, the average time of consuming a single recommendation content item, the average data volume of a single recommendation content item and the fault tolerance factor and the following formula:

$$CacheSize = \frac{TTR}{T} * S * AU * F;$$

wherein CacheSize is the capacity of the cache space for storing the recommendation cache corresponding to the each user, TTR is the average fault repair time of the recommendation server, T is the average time for consuming a single recommendation content, S is the average data volume of a single recommendation content, AU is the average number of active users of the recommendation server within the first time, and F is the fault tolerance factor.

Based on the same inventive concept, as implementation of the above method, the embodiment of the present invention also provides an information flow server and a recommendation server, and this embodiment corresponds to the above method embodiment. For the convenience of reading, this embodiment will not repeat the details of the above method embodiment one by one, but it should be clear that the information flow server and the recommendation server in this embodiment can realize all the contents in the above method embodiment correspondingly.

Figure 3:
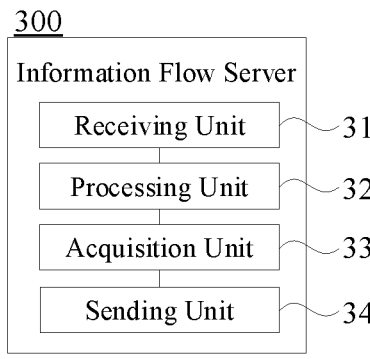
FIG. 3 is a schematic structural diagram of an information flow server provided by an embodiment of the present invention.

An embodiment of the present invention provides an information flow server, and FIG. 3 is a schematic structural diagram of the information flow server. As shown in FIG. 3, the information flow server 300 comprises:

a receiving unit 31, configured to receive, from a terminal device, content request information for requesting to acquire a recommendation content item corresponding to a target user;

a processing unit 32, configured to determine whether a recommendation server is faulty;

an acquisition unit 33, configured to acquire a first recommendation content item according to a recommendation cache corresponding to the target user in response to the recommendation server being faulty, wherein a plurality of recommendation content items are stored in the recommendation cache corresponding to the target user, and the plurality of recommendation content items are written when the recommendation server is not faulty;

a sending unit 34, configured to send the first recommendation content item to the terminal device.

As an optional implementation of the embodiment of the present invention,

The sending unit 34 is further configured to send recommendation request information to the recommendation server in response to the recommendation server being normal, wherein the recommendation request information is configured for requesting to acquire the recommendation content item corresponding to the target user;

The receiving unit 31 is further configured to receive a second recommendation content item sent from the recommendation server;

The sending unit 34 is further configured to send the second recommendation content item to the terminal device.

As an optional implementation of the embodiment of the present invention, the processing unit 32 is specifically configured to acquire status indication information of the recommendation server; and determine whether the recommendation server is faulty according to the status indication information.

As an optional implementation of the embodiment of the present invention, the processing unit 32 is specifically configured to determine that the recommendation server is faulty in response to receiving no response information returned from the recommendation server within a preset response time.

As an optional implementation of the embodiment of the present invention, the recommendation content items in the recommendation cache are ranked in a descending order according to relevance to the target user;

the acquisition unit 33 is specifically configured to determine a first number of recommendation content item(s) ranked top in the recommendation cache; and generate the first recommendation content item according to the first number of recommendation content item(s) ranked top in the recommendation cache.

Figure 4:
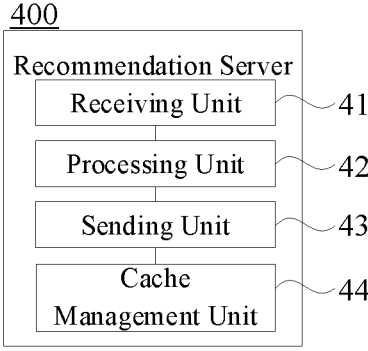
FIG. 4 is a schematic structural diagram of a recommendation server provided by an embodiment of the present invention.

The embodiment of the present invention provides a recommendation server, and FIG. 4 is a schematic structural diagram of the information flow server. As shown in FIG. 4, the recommendation server 400 comprises:

a receiving unit 41, configured to receive recommendation request information sent from an information flow server, wherein the recommendation request information is configured for requesting to acquire a recommendation content item corresponding to a target user;

a processing unit 42, configured to acquire a recommendation content sequence corresponding to the target user according to a preset recommendation algorithm, wherein the recommendation content sequence comprise a plurality of recommendation content items, and the plurality of recommendation content items are ranked in a descending order according to relevance to the target user;

a sending unit 43, configured to send a second number of recommendation content item(s) ranked top in the recommendation content sequence to the information flow server;

a cache management unit 44, configured to write the recommendation content sequence into a recommendation cache corresponding to the target user.

As an optional implementation of the embodiment of the present invention, the sending unit 43 is further configured to send status indication information to the information flow server, wherein the status indication information is configured for indicating whether the recommendation server is faulty.

As an optional implementation of the embodiment of the present invention, the cache management unit 44 is further configured to, before writing the recommendation content sequence into the recommendation cache corresponding to the target user, perform deduplication processing on the recommendation content items in the recommendation content sequence according to recommendation content items stored in the recommendation cache corresponding to target user and recommendation content item(s) sent to the information flow server.

As an optional implementation of the embodiment of the present invention, the cache management unit 44 is further configured to clear the recommendation content items in the recommendation cache corresponding to the target user in response to a length of time exceeds a first time, wherein the recommendation content item(s) corresponding to the target user are not sent from the information flow server to a terminal device corresponding to the target user in the length of time.

As an optional implementation of the embodiment of the present invention, the cache management unit 44 is further configured to determine a capacity of a cache space for storing a recommendation cache corresponding to each user according to at least one of an average number of active users of the recommendation server within the first time, an average fault repair time of the recommendation server, an average time of consuming a single recommendation content item, an average data volume of a single recommendation content item or a fault tolerance factor.

As an optional implementation of the embodiment of the present invention, the capacity of the cache space of the recommendation cache corresponding to the each user has a positive correlation with the average number of active users of the recommendation server within the first time, the average fault repair time of the recommendation server, the average data volume of a single recommendation content item or the fault tolerance factor, and has a negative correlation with the average time of consuming a single recommendation content.

As an optional implementation of the embodiment of the present invention, the cache management unit 44 is specifically configured to determine the capacity of the cache space for storing the recommendation cache corresponding to the each user according to the average number of active users of the recommendation server within the first time, the average fault repair time of the recommendation server, the average time of consuming a single recommendation content item, the average data volume of a single recommendation content item and the fault tolerance factor and the following formula:

$$CacheSize = \frac{TTR}{T} * S * AU * F;$$

wherein CacheSize is the capacity of the cache space for storing the recommendation cache corresponding to the each user, TTR is the average fault repair time of the recommendation server, T is the average time for consuming a single recommendation content, S is the average data volume of a single recommendation content, AU is the average number of active users of the recommendation server within the first time, and F is the fault tolerance factor The information flow server and the recommendation server provided by this embodiment can execute the content recommendation method provided by the above method embodiment, and the implementation principle and the technical effect thereof are similar, which are not described here.

Figure 5:
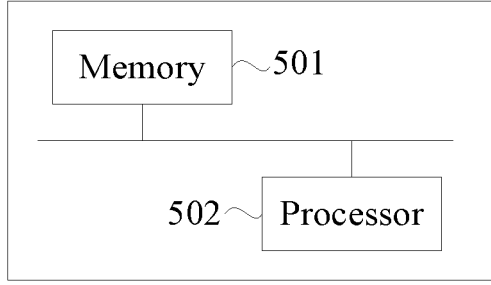
FIG. 5 is a schematic diagram of a hardware structure of an electronic device provided by an embodiment of the present invention.

Based on the same inventive concept, the embodiment of the present invention also provides an electronic device. FIG. 5 is a schematic structural diagram of an electronic device provided by an embodiment of the present invention. As shown in FIG. 5, the electronic device provided by this embodiment includes a memory 501 and a processor 502, wherein the memory 501 is used for storing a computer program, and the processor 502 is used for executing the content recommendation method provided in the above embodiment when executing a computer program.

Based on the same inventive concept, the embodiment of the present invention also provides a non-transitory computer-readable storage medium, on which a computer program is stored which, when executed by a processor, causes the computing device to implement the content recommendation method provided in the above embodiment.

Based on the same inventive concept, the embodiment of the present invention also provides a non-transitory computer program product, which, when run on a computer, causes the computing device to implement the content recommendation method provided in the above embodiment.

Based on the same inventive concept, the embodiment of the present invention also provides a computer program, which comprises instructions that, when executed by a processor, cause the processor to execute the content recommendation method provided in the above embodiment.

It should be understood by those skilled in the art that embodiments of the present invention can be provided as a method, a system, or a computer program product. Therefore, the present invention can take a form of an entirely hardware embodiment, an entirely software embodiment or an embodiment containing both hardware and software elements. Moreover, the present invention may take a form of a computer program product embodied on one or more computer usable storage media having computer usable program codes embodied therein.

The processor can be a Central Processing Unit (CPU), other general processors, Digital Signal Processor (DSP), application specific integrated circuits (ASIC), ASIC), Field-Programmable Gate Array (FPGA) or other programmable logic devices, discrete gate or transistor logic devices, discrete hardware components, etc. The general processor can be a microprocessor or the processor can be any conventional processor, etc.

The memory may include forms of volatile memory in a computer readable medium, Random Access Memory (RAM) and/or non-volatile memory, such as Read Only Memory (ROM) or flash memory (flash RAM). The memory is an example of a computer-readable medium.

Computer readable media include both permanent and non-permanent, removable and non-removable storage media. The storage media can store information by any method or technology, and the information can be computer-readable instructions, data structures, program modules or other data. Examples of computer storage media include, but are not limited to, phase change memory (PRAM), Static Random Access Memory (SRAM), Dynamic Random Access Memory (DRAM), other types of Random Access Memory (RAM), Read Only Memory (ROM), Electrically Erasable Programmable Read Only Memory (EEPROM), flash memory or other memory technology, Compact Disc Read Only Memory (CD-ROM), Digital Versatile Disks (DVD) or other optical storage, magnetic cassettes, magnetic disk storage or other magnetic storage devices, or any other non-transmission medium, which can be used to store information that can be accessed by a computing device. As defined herein, computer-readable media do not include transitory computer-readable media, such as modulated data signals and carrier waves.

Finally, it should be noted that the above embodiments are only used to illustrate the technical solutions of the present invention, but not to limit them. Although the present invention has been described in detail with reference to the foregoing embodiments, it should be understood by those ordinary skilled in the art that the technical solutions described in the foregoing embodiments can still be modified, or some or all of their technical features can be substituted by equivalents. However, these modifications or substitutions do not make the essence of the corresponding technical solutions deviate from the scope of the technical solutions of various embodiments of the present invention.

What is claimed is:

1. A content recommendation method applied to an information flow server, comprising:

receiving, from a terminal device, content request information for requesting to acquire a recommendation content item corresponding to a target user;

determining whether a recommendation server is faulty;

acquiring a first recommendation content item according to a recommendation cache corresponding to the target user in response to the recommendation server being faulty, wherein a plurality of recommendation content items are stored in the recommendation cache corresponding to the target user, and the plurality of recommendation content items are written when the recommendation server is not faulty; and sending the first recommendation content item to the terminal device.

2. The content recommendation method according to claim 1, further comprising:

sending recommendation request information to the recommendation server in response to the recommendation server being normal, wherein the recommendation request information is configured for requesting to acquire the recommendation content item corresponding to the target user;

receiving a second recommendation content item sent from the recommendation server; and sending the second recommendation content item to the terminal device.

3. The content recommendation method according to claim 1, wherein the determining whether a recommendation server is faulty comprises:

acquiring status indication information of the recommendation server; and determining whether the recommendation server is faulty according to the status indication information.

4. The content recommendation method according to claim 1, wherein the determining whether a recommendation server is faulty comprises:

determining that the recommendation server is faulty in response to receiving no response information returned from the recommendation server within a preset response time.

5. The content recommendation method according to claim 1, wherein the recommendation content items in the recommendation cache are ranked in a descending order according to relevance to the target user, and the acquiring the first recommendation content item according to the recommendation cache corresponding to the target user comprises:

determining a first number of recommendation content item(s) ranked top in the recommendation cache; and generating the first recommendation content item according to the first number of recommendation content item(s) ranked top in the recommendation cache.

6. A content recommendation method applied to a recommendation server, comprising:

receiving recommendation request information sent from an information flow server, wherein the recommendation request information is configured for requesting to acquire a recommendation content item corresponding to a target user;

acquiring a recommendation content sequence corresponding to the target user according to a preset recommendation algorithm, wherein the recommendation content sequence comprise a plurality of recommendation content items, and the plurality of recommendation content items are ranked in a descending order according to relevance to the target user; and sending a second number of recommendation content item(s) ranked top in the recommendation content sequence to the information flow server, and writing the recommendation content sequence into a recommendation cache corresponding to the target user.

7. The method according to claim 6, further comprising:

sending status indication information to the information flow server, wherein the status indication information is configured for indicating whether the recommendation server is faulty.

8. The method according to claim 6, further comprising:

before writing the recommendation content sequence into the recommendation cache corresponding to the target user, performing deduplication processing on the recommendation content items in the recommendation content sequence according to recommendation content items stored in the recommendation cache corresponding to target user and recommendation content item(s) sent to the information flow server.

9. The method of claim 8, further comprising:

clearing the recommendation content items in the recommendation cache corresponding to the target user in response to a length of time exceeds a first time, wherein the recommendation content item(s) corresponding to the target user are not sent from the information flow server to a terminal device corresponding to the target user in the length of time.

10. The method according to claim 8, further comprising:

determining a capacity of a cache space for storing a recommendation cache corresponding to each user according to at least one of an average number of active users of the recommendation server within the first time, an average fault repair time of the recommendation server, an average time of consuming a single recommendation content item, an average data volume of a single recommendation content item or a fault tolerance factor.

11. The method according to claim 10, wherein the capacity of the cache space of the recommendation cache corresponding to the each user has a positive correlation with the average number of active users of the recommendation server within the first time, the average fault repair time of the recommendation server, the average data volume of a single recommendation content item or the fault tolerance factor, and has a negative correlation with the average time of consuming a single recommendation content.

12. The method according to claim 10, the determining the capacity of the cache space for storing the recommendation cache corresponding to the each user according to at least one of the average number of active users of the recommendation server within the first time, the average fault repair time of the recommendation server, the average time of consuming a single recommendation content item, the average data volume of a single recommendation content item or the fault tolerance factor comprises:

determining the capacity of the cache space for storing the recommendation cache corresponding to the each user according to the average number of active users of the recommendation server within the first time, the average fault repair time of the recommendation server, the average time of consuming a single recommendation content item, the average data volume of a single recommendation content item and the fault tolerance factor and the following formula:

$$CacheSize = \frac{TTR}{T} * S * AU * F;$$

wherein CacheSize is the capacity of the cache space for storing the recommendation cache corresponding to the each user, TTR is the average fault repair time of the recommendation server, T is the average time for consuming a single recommendation content, S is the average data volume of a single recommendation content, AU is the average number of active users of the recommendation server within the first time, and F is the fault tolerance factor.

13. An electronic device, comprising:

a memory; and a processor coupled to the memory, the processor being configured to, based on instructions stored in the memory, implement a content recommendation method comprising:

receiving, from a terminal device, content request information for requesting to acquire a recommendation content item corresponding to a target user;

determining whether a recommendation server is faulty;

acquiring a first recommendation content item according to a recommendation cache corresponding to the target user in response to the recommendation server being faulty, wherein a plurality of recommendation content items are stored in the recommendation cache corresponding to the target user, and the plurality of recommendation content items are written when the recommendation server is not faulty; and sending the first recommendation content item to the terminal device.

14. A non-transitory computer-readable storage medium having stored thereon a computer program which, when executed by a computing device, implements the content recommendation method according to claim 1.

15. The electronic device according to claim 13, wherein the processor is further configured to:

send recommendation request information to the recommendation server in response to the recommendation server being normal, wherein the recommendation request information is configured for requesting to acquire the recommendation content item corresponding to the target user;

receive a second recommendation content item sent from the recommendation server; and send the second recommendation content item to the terminal device.

16. The electronic device according to claim 13, wherein the determining whether a recommendation server is faulty comprises:

acquire status indication information of the recommendation server; and determine whether the recommendation server is faulty according to the status indication information.

17. The electronic device according to claim 13, wherein the determining whether a recommendation server is faulty comprises:

determining that the recommendation server is faulty in response to receiving no response information returned from the recommendation server within a preset response time.

18. The electronic device according to claim 13, wherein the recommendation content items in the recommendation cache are ranked in a descending order according to relevance to the target user, and the acquiring the first recommendation content item according to the recommendation cache corresponding to the target user comprises:

determining a first number of recommendation content item(s) ranked top in the recommendation cache; and generating the first recommendation content item according to the first number of recommendation content item(s) ranked top in the recommendation cache.

19. An electronic device, comprising:

a memory; and a processor coupled to the memory, the processor being configured to, based on instructions stored in the memory, implement the content recommendation method according to claim 6.

20. A non-transitory computer-readable storage medium having stored thereon a computer program which, when executed by a computing device, implements the content recommendation method according to claim 6.

* * * * *